Aug. 13, 1946.    G. E. FRANCK    2,405,822
SEALED FLEXIBLE COUPLING
Filed Feb. 26, 1943
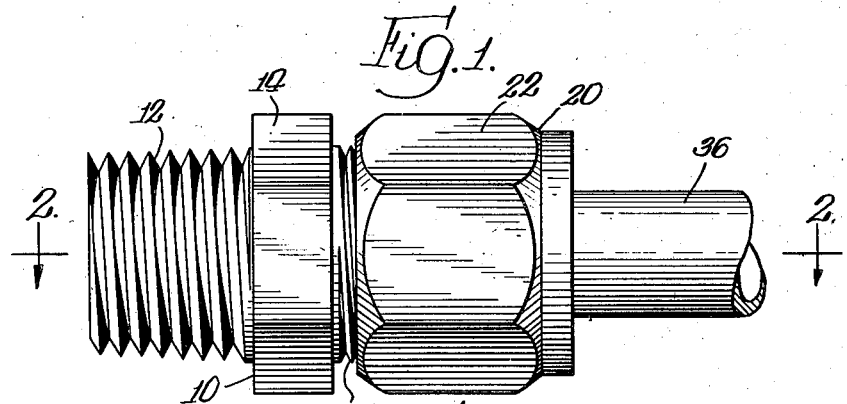
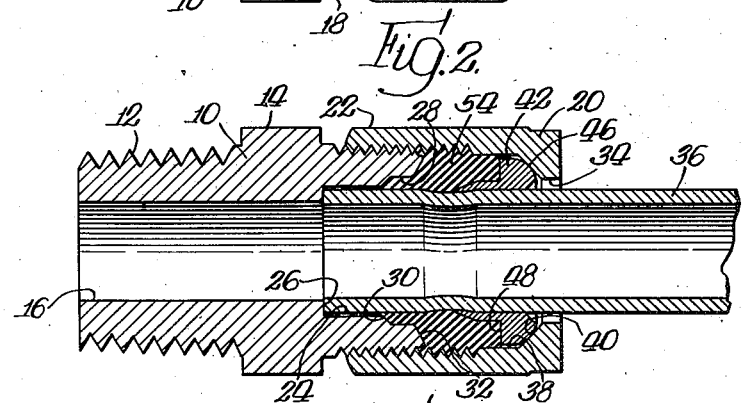
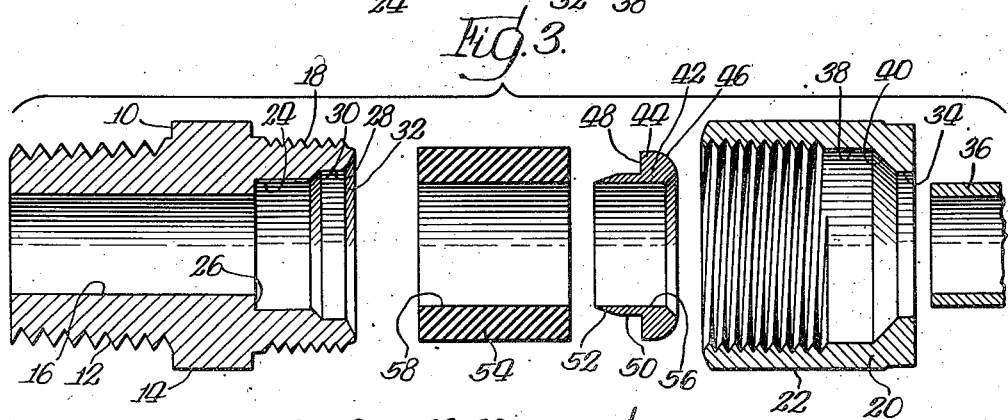
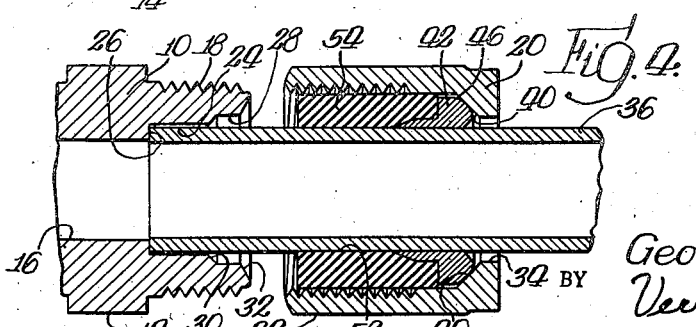
INVENTOR.
George E. Franck,
BY Patented Aug. 13, 1946

2,405,822

UNITED STATES PATENT OFFICE 2,405,822

SEALED FLEXIBLE COUPLING

George E. Franck, Riverside, Ill., assignor to The Imperial Brass Manufacturing Company, Chicago, Ill., a corporation of Illinois Application February 26, 1943, Serial No. 477,183

6 Claims. (Cl. 285—90)

My invention relates to couplings for tubing and particularly couplings which can be classed as resilient, or semi-resilient, which are used for connecting the ends of relatively thin-walled tubing by means of a joint which will reduce the tendency of vibration to crack the wall of the tubing at the joint.

Among the objects of my invention is to provide a new and improved coupling for tubing which has incorporated within it a resilient material which remains resilient after the coupling is made up and which is further provided with a ring or ferrule for closing the coupling so that the resilient material is prevented from running out of the joint in case the coupling should be subjected to an excessive amount of heat.

Another object of my invention is to provide a new and improved semi-resilient coupling joint including a resilient material which serves the combined purpose of a packing and a resilient cushion held in place by a suitable dam, the dam being so constructed as to permit a certain limited freedom of motion of the tubing which is fastened into the coupling.

Still another object of my invention is to provide a semi-resilient type of coupling for relatively thin-walled tubing in which is incorporated a permanent resilient substance secured in place by a sleeve so constructed that the combined action of the resilient material under pressure and the movement of the sleeve into the coupling as the coupling is assembled forces a portion of the sleeve into a slight indention in the wall of the tube to more securely hold the tube in place after the coupling has been assembled.

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:

Figure 1 is an elevational view of the assembled coupling.

Figure 2 is a longitudinal sectional view of the assembled coupling.

Figure 3 is an exploded view showing the various parts of the coupling before they are placed together in anticipation of a coupling action.

Figure 4 is a view showing the parts of the coupling assembled prior to the completion of the coupling operation.

Frequent attempts have been made in the past to produce what is commonly known as a vibration-proof coupling. Most of these devices have had incorporated in them some type of resilient material in an attempt to provide a slight freedom of motion for the tube within the coupled joint. Different types of structures have been found more suitable for use on some installations than they have on others.

A variety of conditions are encountered which make it extremely difficult to construct an all purpose, vibration-proof coupling. One of the conditions which is frequently encountered is the presence of high temperature near the coupling. High temperatures frequently have a tendency to soften the resilient material. When this happens, the material is inclined to flow out of the coupling joint and thus reduce the efficiency and proper sealing characteristics of the coupling joint. Although the coupling can be remade tight by drawing up the nut, each time this is done, a little more of the resilient material is squeezed out until eventually the coupling looses its resilient character and becomes a conventional packed joint and may even leak as a result. In order to overcome some of these difficulties, I have devised a new joint which is designed to hold the resilient material in place at all times without sacrificing the desired resilient characteristics.

As shown in the drawing, there is provided a body 10 having a pipe thread connection 12 and a hexagonal mid-portion 14 to provide a wrench hold. A fluid passage 16 extends axially through the center of the body. At the end opposite from the pipe thread, there is a threaded portion 18 adapted to be engaged by a correspondingly threaded portion of a nut 20. The nut is also provided with a hexagonal portion 22 to provide a wrench hold. Within the body adjacent the end which engages the nut is a set-back portion 24, the bottom 26 of which forms an abutment for the tube to be coupled. At the same time there is also provided a second set-back portion 28 having a sloping bottom 30 which forms a secondary enlargement of greater diameter than the first. An annular beveled edge 32 forms the outside end of the body facing the nut.

The nut 20 has a passage 34 substantially larger than the outside diameter of a tube 36 which is coupled into the joint for reasons which will be explained later. The nut is likewise provided with an enlarged pocket 38 which is joined to the passage 34 by means of an obliquely sloping annular bottom wall 40. The pocket in the nut is designed to face the enlarged adjacent end of the body.

The inner element of the coupling comprises a sleeve 42 which consists of a flange 44 having a rounded surface 46 facing the nut and a flat face 48 perpendicular to the axis of the coupling and facing the body. A cylindrical neck 50 on the sleeve extends from the flat face in a direction toward the body when the coupling is assembled. The neck terminates in a knife edge 52.

Also within the coupling is a ring 54 which can be of any convenient cross-sectional shape but which comprises a material which is resilient and substantially incompressible when confined within a limited space. The material must have the property of flowing and adjusting itself to a space different in cross-sectional shape from the initial cross-sectional shape of the ring. The sleeve has a central passage 56 sufficiently large so that it will slip easily over the outside wall of the tube 36. The ring is provided with a passage 58 of about the same diameter as the diameter of the outside wall of the tubing. Although the ring is designed to slip over the neck of the sleeve, it need not be of such a large diameter that it slips over the neck without stretching.

When the coupling is to be made up on a piece of thin-walled tubing, the nut 20 is first slid over the end of the tube. Next, the sleeve 42 is slid over the tube into position within the pocket 38 of the nut. After these pieces have been applied to the tube, the resilient ring 54 is slid over the end of the tube. The nut, the sleeve and the ring are then assembled together so that the two last named parts are within the pocket in the nut as shown in Figure 4.

When this partial assembly has been completed, the end of the tube is inserted into the enlarged end 24 of the body passage until the end of the tube abuts against the bottom 26 so as to firmly position the tube in its proper place. It will be noted that the enlargement 24 which surrounds the end of the tube need not provide an excessive amount of play. In practice this play or clearance is approximately $10/1000$ of an inch on a side, that is, a total of $20/1000$ of an inch.

When this has been done, the threads in the nut are engaged with the threaded portion 18 of the body and the nut screwed on to the body with considerable force. As the nut is screwed down, the ring 54 is pressed axially into the open end of the body and radially against the beveled end of the sleeve. The ring is likewise forced axially against the flat surface 48 of the sleeve. There is sufficient compressive force when the body and nut are coupled together to force the resilient incompressible ring material against the knife-edge 52 at the end of the neck 50, so that the knife-edge portion is deflected slightly into a depression in the wall of the tube. This action increases considerably the ability of the coupling to hold the tube in place.

In assembled position, as shown in Figure 2, the rounded surface 46 on the flange 44 is forced into tangential contact with the annular oblique bottom of the pocket 38 in the nut. The sleeve also serves to center the tubing in the coupling. By reason of this construction, when the tube 36 is vibrated relative to the coupling, it is permitted a certain limited freedom of movement and due to the fact that there is a substantial clearance between the wall of the tube and the wall of the passage 34, there will be no contact made between them. As the tube is vibrated it moves with a pendulum like motion from side to side and the rounded surface 46 is permitted to pivot against the oblique bottom 40 much like a universal joint. Although the ring material may be of an incompressible character, nevertheless it retains its property of flowing. Therefore, when the tube is displaced laterally due to vibration, the sleeve may be shifted slightly from side to side. When this happens, the material forming the ring will be forced from one side of the coupling to the other a slight amount, permitting one side of the sleeve to ride up the oblique annular bottom of the nut while the other side of the sleeve rides down the same oblique surface.

It will further be noted that the wall of the pocket 38 in the nut is of a slightly greater diameter than the circumference of the flange on the sleeve thereby permitting a limited shifting of the flange in a lateral direction when the coupling is subjected to vibration.

Further, by reason of the fact that the ring is confined within the coupling by means of the sleeve, there will be no likelihood that the material forming the ring will leak out of the joint even though it might be softened to a readily flowing consistency when the coupling is subjected to heat.

There has thus been provided a resilient coupling which will retain its resiliency when subjected to a variety of temperature conditions and one which is so constructed that it provides an extra grip on the tube so that the tube cannot be pulled out of the coupling and so that even when subjected to continued use, the joint will remain tightly sealed.

Some changes may be made in the arrangement and construction of the various parts of my resilient coupling without departing from the real spirit and purpose of my invention, and it is my intention to cover by my claims, any modified forms of structure or use of mechanical equivalents, which may be reasonably included within their scope.

I claim as my invention:

1. A coupling for thin walled tube comprising members including a body threaded at one end and having a passage therethrough, a nut having a threaded pocket engageable with the body, a passage therethrough and an annular bottom in the pocket; and a sleeve having an opening therein slidable over the tube, said sleeve comprising a flange adapted to shiftably contact the annular bottom of the pocket when the coupling is assembled and a neck, a ring of resilient material of incompressible character having the property of flowing, said ring having initially an arbitrary shape and having an initial position adjacent the neck and flange of the ring in anticipation of a coupling operation and in coupled relation having a form and position confined within a space formed by the wall of the tube, one side of the sleeve and the coupling members, said neck being in forced contact with the tube under pressure exerted by the ring.

2. A coupling for thin walled tube comprising members including a body threaded at one end and having a passage therethrough and an annular enlargement at the end of the passage adjacent the threads, said enlargement having a bottom providing an abutment for the tubing, a nut having a threaded pocket engageable with the body, a passage through the nut, and a sleeve having an opening therein slidable over the tube, said sleeve comprising a flange having one curved side adapted to shiftably contact the annular bottom of the pocket when the coupling is in an assembled position and a relatively thin neck, a ring initially of an arbitrary shape comprising a resilient material of incompressible character having the property of flowing, said ring having a position surrounding the neck in anticipation of a coupling operation and in coupled relation having a form and position confined in a space formed by the wall of the tube and the coupling members, said neck being deflected by said ring into engagement with the tube to aid in holding the tube in the coupling.

3. A coupling for thin walled tube comprising members including a body threaded at one end and having a passage therethrough and an annular enlargement at the end of the passage adjacent the threads, said enlargement including a sloping bottom, a nut having a threaded portion engageable with the body, a passage therethrough and a pocket between the passage and the threaded portion having an oblique annular bottom, and a sleeve having an opening therein slidable over the tube, said sleeve comprising a relatively thin neck and a flange having one curved side adapted to have shiftable contact with the oblique annular bottom of the pocket at a tangent thereto when the coupling is assembled, a ring of resilient material of incompressible character having the property of flowing, said ring having an initial arbitrary shape for surrounding the neck in anticipation of a coupling operation and in coupled relation being confined in a space formed by the wall of the tube and the coupling members, the neck of said sleeve having in coupled position a form deflected by said ring into engagement with the tube to aid in holding the tube in the coupling.

4. A coupling for thin walled tube comprising members including a body threaded at one end and having a passage therethrough and an annular enlargement at the end of the passage adjacent the threads, a nut having a threaded pocket engageable with the body, a passage through the nut, and a sleeve having an opening therein slidable over the tube, said sleeve comprising a flange having one curved side adapted to shiftably contact the annular bottom of the pocket when the coupling is in an assembled position and a relatively thin neck, a ring initially of an arbitrary shape comprising a resilient material of incompressible character having the property of flowing, said ring having a position adapted to surround the neck in anticipation of a coupling operation and in coupled relation having a form and position confined in a space formed by the wall of the tube and the coupling members, said neck having a position deflected into engagement with the tube to aid in holding the tube in the coupling.

5. A flexible coupling for thin walled tube comprising a first member threaded at one end and having a passage therethrough, a second member threaded for engagement with said first member and having therein a passage larger than the tube to be coupled, a pocket portion of enlarged diameter coaxial with the passage and an inclined annular surface intermediate the passage and the pocket portion, a ring of resilient material of incompressible character having the property of flowing under pressure mounted in surrounding relation to the tube to be coupled and in the annular space formed between the tube and the members of the coupling, said ring initially having an arbitrary shape and upon assembly of the coupling taking the shape of the annular space in which it is confined, and a metallic sleeve adapted to surround the tube to be coupled and having a radially extending flange with an external diameter smaller than the pocket portion of said second member and a rounded face adapted to have line contact with the inclined surface of said second member, a portion of said sleeve being forced into a pressed fit with the tube by pressure applied through the ring of resilient material as an incident to assembly of the coupling.

6. A flexible coupling for thin walled tube comprising a body member threaded at one end and having a stepped axial bore forming a passage with an enlarged portion at the threaded end of said member and an annular abutment for limiting the extent of insertion of a tube to be coupled; a nut member threaded for engagement with the body member and having a pocket opening axially toward the body member extending over the major axial length of the nut member and a passage extending through the balance of the nut member, said passage having a diameter smaller than the pocket but large enough for the passage therethrough, with clearance permitting lateral movement, of a tube to be coupled, and an annular surface oblique to the axis of the nut member disposed between the passage and the side walls of the pocket; a metallic sleeve slidable on a tube to be coupled and having a radially outwardly extending annular flange at one end thereof and a thin walled neck portion extending axially inwardly in assembled position, the flange on said sleeve having a diameter smaller than the pocket and a rounded face adapted shiftably to engage the annular surface of said nut member; and a ring of substantially incompressible but deformable material, said ring having initially an arbitrary cross sectional shape slidable over a tube to be coupled and receivable within the coupling, said ring upon assembly of the coupling taking the form of the annular space formed by the coupling and the tube and depressing the end of the neck of said sleeve radially inwardly.

GEORGE E. FRANCK.